J. Solter,
Tumbler Washer,
No. 2,883. Reissued Feb. 25, 1868.
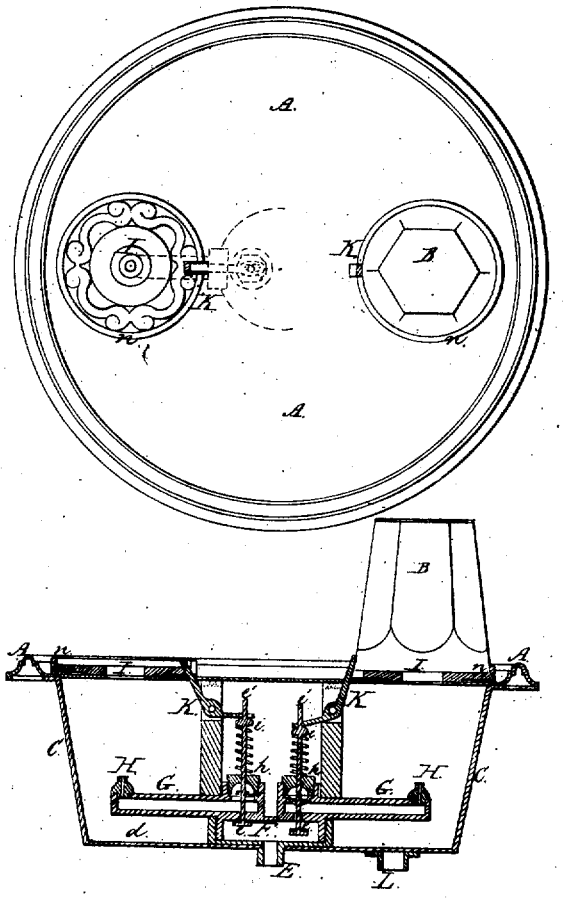
Witnesses;
John F. Clark.
Wm. G. Clark.
Inventor,
Jno. Solter.

UNITED STATES PATENT OFFICE.

JOHN SOLTER, OF BALTIMORE, MARYLAND.

IMPROVED TUMBLER-WASHER.

Specification forming part of Letters Patent No. 57,786, dated September 4, 1866; Reissue No. 2,883, dated February 25, 1868.

*To all whom it may concern:*

Be it known that I, JOHN SOLTER, of the city and county of Baltimore, and State of Maryland, have invented certain new and useful Improvements in Tumbler-Washers; and I do hereby declare that the following is a full, clear, and exact description thereof, reference being had to the accompanying drawing.

The nature of my invention consists in providing a neat ornamental device or tray for holding and washing tumblers or goblets, thus dispensing with the trough or tub usually employed for that purpose. For this purpose, by placing a tumbler on the tray, a jet of water is made to enter the same and the supply of water cut off by its removal from the tray, thus effecting a great saving in the use of water, and at the same time nicely cleansing the glass. This operation is accomplished by mechanism so simple that its result is certain, and should it be found desirable to have a shower or jet to wash the outside of the tumblers it will not interfere with my invention for washing the inside of the glasses and keeping them cool.

To enable others to make and use my invention, I shall now proceed to describe its construction and operation.

A A is the surface plate or tray for the reception of the tumblers or goblets B. In the drawing there are only two openings represented, but any number may be formed, corresponding with the number of tumblers required.

*c c* are the sides or rims, and *d* the bottom, forming a cup, which, when joined with flanges and bolts to A, form a receptacle for the mechanism and pipes for introducing the water.

E is the inlet-pipe, which is to be connected with the supply or service pipe.

F is a water-chest, and G G pipes communicating with the same when the valves *e e* are opened by depressing the valve-rods *e′ e′* in the drawing, one of these being shown depressed and the valve open, while the other is raised and the valve closed.

H H are nozzles for directing the water into the tumblers through openings I in the tray A.

*h h* are screw-nuts for compressing the packing, and also serve as guides to the valve-stem. Above these nuts are placed helical springs *i i*, for closing the valves, they being confined on the stems between a collar thereon and the nuts *i i*.

K is a bent lever slotted at one end to embrace the valve rod or stem, while the other end passes through the tray A, projecting sufficiently above the surface of the tray to be readily brought in contact with the rim or edge of the tumbler or goblet.

*n n* are projecting rims or borders corresponding in size or diameter with the tumblers.

L is a drain-pipe for passing off the waste water.

In using my improvement, place the cup or vessel in an opening in the counter, so that the tray A will be level therewith, and connect the inlet-pipe with the service-pipe. The tumblers are placed between the end of the lever K and the rim *n* on the tray, and thus move the lever toward the center of the tray, while the lower end of said lever depresses the valve rod and valve, and allows the water to pass through the nozzle into the tumbler. On the removal of the tumbler the helical spring lifts the valve and cuts off the supply of water.

The rim *n* is not considered absolutely necessary for holding the tumblers, as several lugs may serve the same purpose, and the valve which lets in the water (when the tumbler is put in place on the tray) may be operated in several equivalent ways without changing the nature of my invention.

Having thus described my invention, what I claim as new, and desire to secure by Letters Patent of the United States, is—

1. In a tumbler-washing machine, operating the valve *e* by pressing the tumbler in seating it, in the manner as shown and described, and for the purpose set forth.

2. The combination of the lever K and valve *e*, constructed and operated in the manner substantially as shown and described, and for the purpose set forth.

JOHN SOLTER.

Witnesses:
S. S. FAHNESTOCK,
THEODORE LANG.